Sept. 16, 1958

I. A. BERRY ET AL 2,852,053

FRUIT SLICER

Filed Oct. 19, 1954

INVENTORS
WILLARD C. BERRY
INEZ A. BERRY
BY
Wheeler, Wheeler & Wheeler
ATTORNEYS United States Patent Office 2,852,053
Patented Sept. 16, 1958

2,852,053

FRUIT SLICER

Inez A. Berry and Willard C. Berry, Milwaukee, Wis.

Application October 19, 1954, Serial No. 463,088

9 Claims. (Cl. 146—169)

This invention relates to a fruit slicer.

A plunger provided with thin radial slots and a concavity in its bottom end is keyed for reciprocation in a tubular cylinder which has knives mounted in the path of the plunger to be receivable into the slots. A specific feature of improvement is the interlocking of the radial cutting blades with the tubular wall of the cylinder in such fashion that the blades are absolutely rigid against the downward pressure of the work but are instantly releasable by upward thrust on their inner ends to facilitate cleaning of the apparatus.

The tubular cylinder rests on the shoulder of a ring supported by legs at a level such that a dish can readily be positioned beneath the ring and between the legs to receive the severed fruit and the juice therefrom. Again a specific improvement concerns the easily mountable and de-mountable parts and their form and connection in a manner to facilitate cleaning, and/or sharpening.

In the drawings:

Fig. 1 is a view in perspective showing on small scale the plunger spaced above the tubular cylinder in which it operates.

Fig. 2 is an enlarged view of the apparatus in axial section.

Fig. 3 is a view on a still larger scale taken in section on line 3—3 of Fig. 2.

Fig. 4 is a view taken in section on the line 4—4 of Fig. 2.

Fig. 5 is a fragmentary detailed view on a section similar to that of Fig. 2 showing one of the knives in the process of manipulation between its operative position and its withdrawn position.

The plunger 6 has a central cavity at 7 which may be frusto-conical in form as shown in Fig. 2 and is adapted to receive and to center a fruit such as that indicated in dotted lines at 8. The plunger is provided with a number of radial grooves 9 which are barely sufficiently wide to pass the knives hereinafter to be described. Because the parts fit quite closely, it is desirable to key the plunger to the cylinder 10 to define its angular position so that the knives will register with slots 9. To this end, the plunger has a radially projecting lug at 11 guided in a slot 12 of cylinder 10.

Cylinder 10 is tubular. Its lower end telescopes with a reasonably tight fit into a socket 13 to rest on shoulder 14 of the supporting ring 15. The opening at 16 through the ring is desirably as large in diameter as the interior of the tubular cylinder 10. In practice, it is slightly larger. The ring is provided with three legs 17 which are screw-threaded to the ring with coarse threads permitting speedy application and removal. The legs are sufficiently far apart and of sufficient length so that a dish 18 is readily receivable beneath the cylinder as shown.

The tubular cylinder 10 is provided near its lower end with a series of radial slots 19 for the cutting knives 20. The sharpened upper margins 21 of the several knives desirably converge downwardly to the axis of the cylinder. The knives have inner ends 22, which meet at the axis as clearly shown in Figs. 2 and 3. The outer margins 24 of the respective knives are desirably finished to be flush with the outer periphery of the tubular cylinder 10.

Each knife has a notch at 25 in its lower margin 26 to receive an edge or fulcrum portion 27 of the tubular cylinder which is formed by downwardly and outwardly bevelling the cylinder at the lower end of each slot 19. The cylinder is upwardly and outwardly bevelled at 28 to provide an abutment at the upper end of each slot.

The dimensions of the respective knives accurately correspond to the dimensions of the slot and to the dimensions of the tubular cylinder so that, when the knives are positioned as shown in Figs. 2 and 3, the notched lower margin of each knife will be tightly engaged with the apex 27, the upper margin of each knife will be tightly engaged with the bevel 28 and the inner ends of the several knives will be in substantial abutment with each other on the axis of the cylinder. This provides an extremely rigid structure which adequately sustains the fruit during the slicing operation under the thrust of plunger 6. Yet, finger pressure of the operator upwardly along the axis of the cylinder from its lower end will cause the several knives to pivot outwardly, as shown in Fig. 5, whereupon the projecting corners 30 may readily be grasped by the operator to withdraw the knives individually for cleaning.

The knives may be replaced with equal facility by simply inserting them into the respective slots 19, engaging their notched portions 25 with the bevel 27 and pivoting the knives inwardly to the locked position shown in Fig. 2 and above described.

Thus the cleaning of the device requires but a few minutes. The plunger is freely removable from the cylinder. The cylinder is freely removable from the ring. The legs are freely removable from the ring. The knives are freely removable from the cylinder. Removal of the several parts leaves each entirely unencumbered for cleaning. No tools are required for assembly or disassembly.

While the device has particular utility in connection with the slicing of lemons for beverage purposes, it may also be used for slicing any other fruit or vegetable within its capacity—oranges, apples, pears, potatoes, tomatoes, etc., being examples.

We claim:

1. In a device of the character described, the combination with a tube provided in a side wall portion with a slot which extends generally parallel to the tube axis and expands outwardly at one end, of a knife blade detachably mounted within the tube and having a portion extending into the slot, the said knife blade having a portion complementary to the tube wall at the outwardly expanding end of the slot to pivot on the tube wall in the insertion and removal of the blade, the outer end of the blade having means abutting the tube to preclude further pivotal movement of the blade inwardly upon said portion beyond its operative position but free for outward movement of the blade, said slot being bevelled outwardly at both ends and the blade having an inner margin extending along the axis of the tube and a cutting edge directed away from its said portion and engaged with the tube at the bevelled end of the slot opposite said portion.

2. In a device of the character described, in combination with a tube provided in a side wall portion thereof with a slot extending generally parallel to the tube axis, a fulcrum on the tube at the bottom of the slot and an abutment on the tube at the top of the slot, of a knife blade having a cutting edge within the tube, said blade having a portion pivotally mounted on said fulcrum and a portion disposed against said abutment when the cutting edge of the blade is in cutting position, said blade being pivotally movable about said fulcrum from said cutting position to a retracted position, said tube being beveled outwardly at the top and bottom of said slot to provide respectively said abutment and fulcrum, said knife blade being provided with a notch pivotably engaged with said fulcrum and with an upwardly inclined portion engageable with said abutment.

3. In a device of the character described, the combination with a tube provided in a side wall portion thereof with a slot extending generally parallel to the tube axis, a fulcrum on the tube at the bottom of the slot and an abutment on the tube at the top of the slot, of a knife blade having a cutting edge within the tube, said blade having a portion pivotally mounted on said fulcrum and a portion disposed against said abutment when the cutting edge of the blade is in cutting position, said blade being pivotally movable about said fulcrum from said cutting position to a retracted position, in further combination with a ring having a seat for said tube and legs detachably connected to said ring.

4. In a device of the character described, the combination with a tube provided in a side wall portion thereof with a slot extending generally parallel to the tube axis, a fulcrum on the tube at the bottom of the slot and an abutment on the tube at the top of the slot, of a knife blade having a cutting edge within the tube, said blade having a portion pivotally mounted on said fulcrum and a portion disposed against said abutment when the cutting edge of the blade is in cutting position, said blade being pivotally movable about said fulcrum from said cutting position to a retracted position, in further combination with a plunger axially movable within said tube and having a slot which receives said knife blade in the course of plunger movement.

5. In a slicer, tube means provided with first and second ends and wall portions having longitudinal slots, knives disposed in respective slots and extending toward the center of the tube means and having shoulders engaging the wall portions interiorly at the ends of the slots nearest the second end of said tube means, said knives having portions engaging wall portions of the tube means exteriorly at the ends of the slots nearest the first end of the tube means, whereby portions of the knives at the center of the tube means are supported against pressure toward said second end of the tube means, the knives having cutting edges exposed toward the first end of the tube means.

6. The device of claim 5 in which the knives have notches providing said shoulders and in which notches the interiorly engaged wall portions have outwardly beveled fulcrum edges upon which the knives are freely pivotal outwardly through the respective slots, the cutting edges being inclined to clear the exteriorly engaged wall portions in the course of pivotal movement.

7. The device of claim 5 in which the tube means has inwardly beveled surfaces at the ends of respective slots nearest the second end of the tube means, the knives having notches pivotally engaged over the beveled surfaces aforesaid and having their cutting edges inclined to clear the wall portions nearest the first end of the tube means, the slots having an extent at least as great as the maximum radius of the knives from said notches whereby to accommodate their pivotal movement about the beveled surfaces.

8. The device of claim 7 in which the inclined edges of the knives are continued into the slots, the exteriorly engaged wall portions being complementary thereto.

9. The device of claim 7 in which the tube means comprises a one piece tube having integral portions at both ends of the slots, and means for supporting the tube.

References Cited in the file of this patent

UNITED STATES PATENTS

| | | |
|---|---|---|
| 279,643 | Gilberts | June 19, 1883 |
| 1,581,310 | Fetschan | Apr. 20, 1926 |
| 2,383,814 | Richardson | Aug. 28, 1945 |
| 2,495,770 | Rivet | Jan. 31, 1950 |
| 2,513,341 | Marasco | July 4, 1950 |
| 2,581,294 | Read et al. | Jan. 1, 1952 |
| 2,671,485 | Smith et al. | Mar. 9, 1954 |
| 2,716,950 | Johnston | Sept. 6, 1955 |